Dec. 10, 1940. O. STEINER 2,224,839
APPARATUS FOR MAKING PHOTOGRAPHIC CONTACT PRINTS
Filed Feb. 13, 1939 4 Sheets-Sheet 1
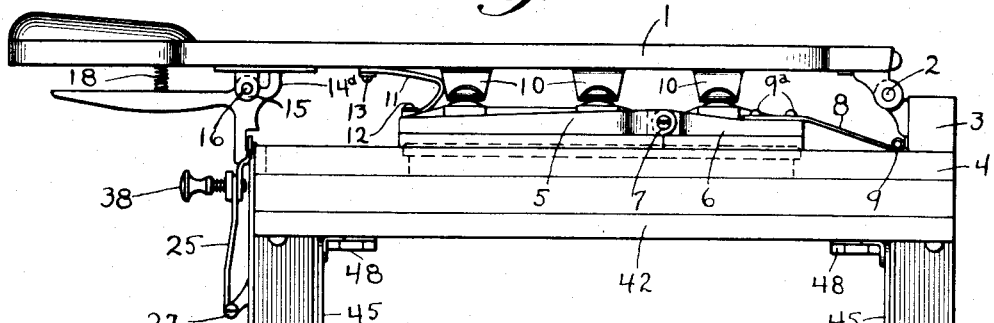
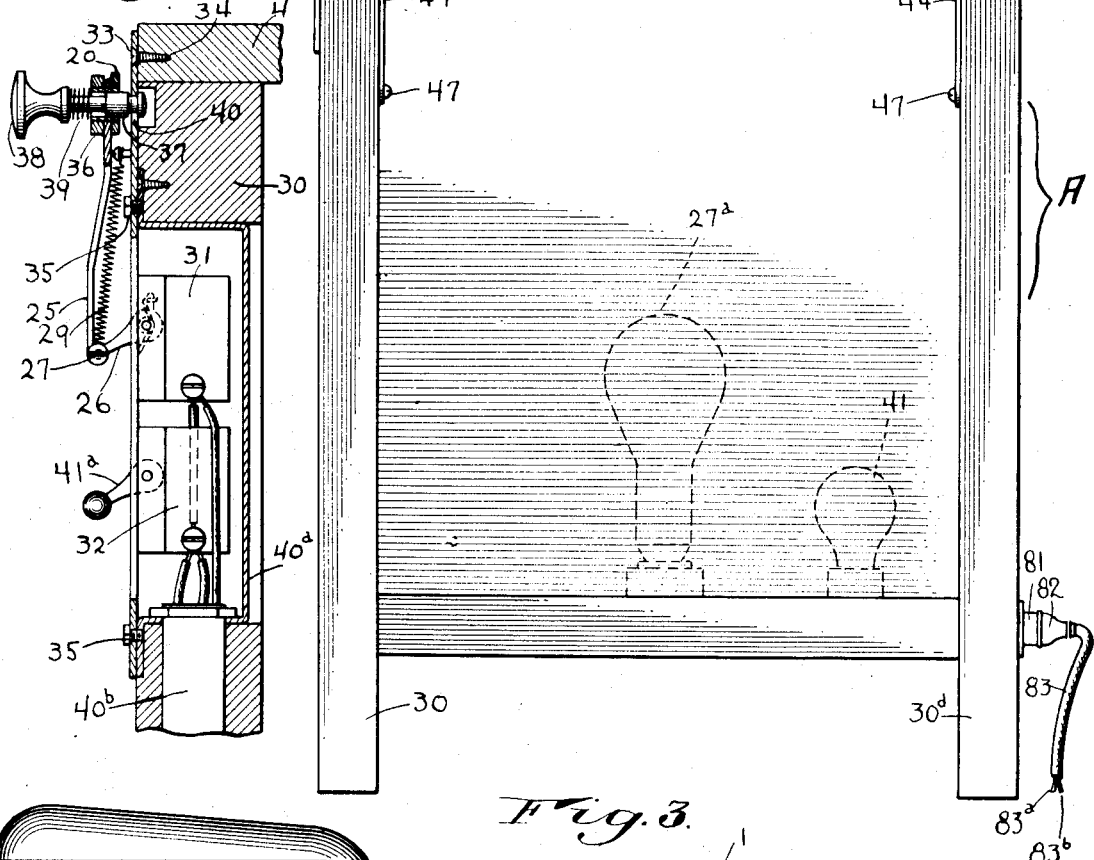
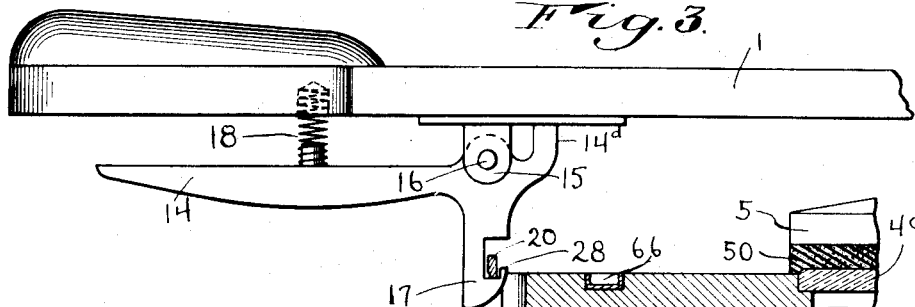
INVENTOR.
Oscar Steiner
BY
his ATTORNEYS Dec. 10, 1940. O. STEINER 2,224,839
APPARATUS FOR MAKING PHOTOGRAPHIC CONTACT PRINTS
Filed Feb. 13, 1939 4 Sheets-Sheet 2
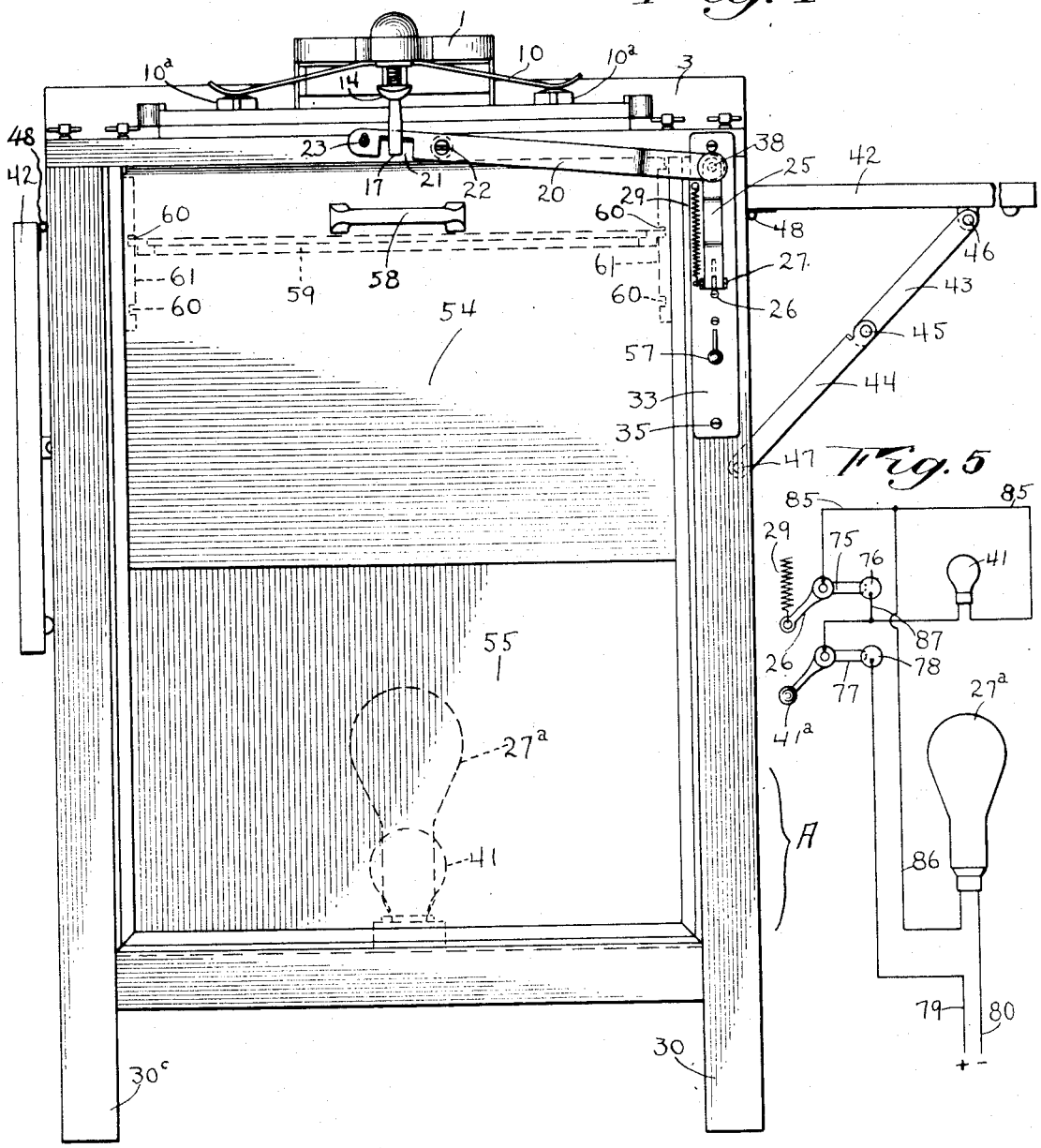
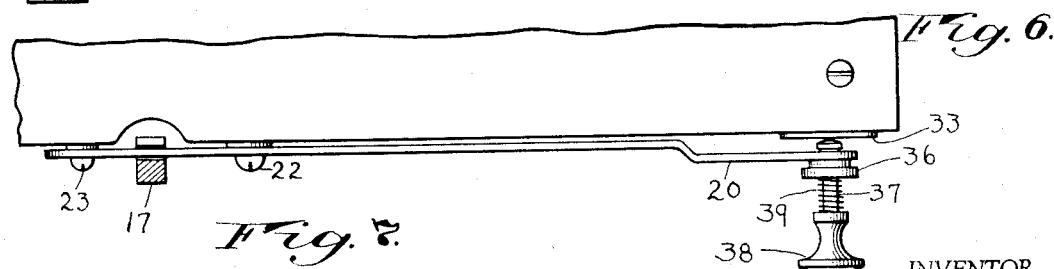
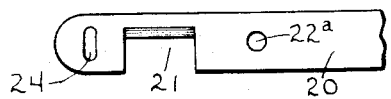
INVENTOR.
Oscar Steiner
BY
his ATTORNEYS Dec. 10, 1940.   O. STEINER   2,224,839
APPARATUS FOR MAKING PHOTOGRAPHIC CONTACT PRINTS
Filed Feb. 13, 1939   4 Sheets-Sheet 3

INVENTOR.
Oscar Steiner
BY
his ATTORNEYS

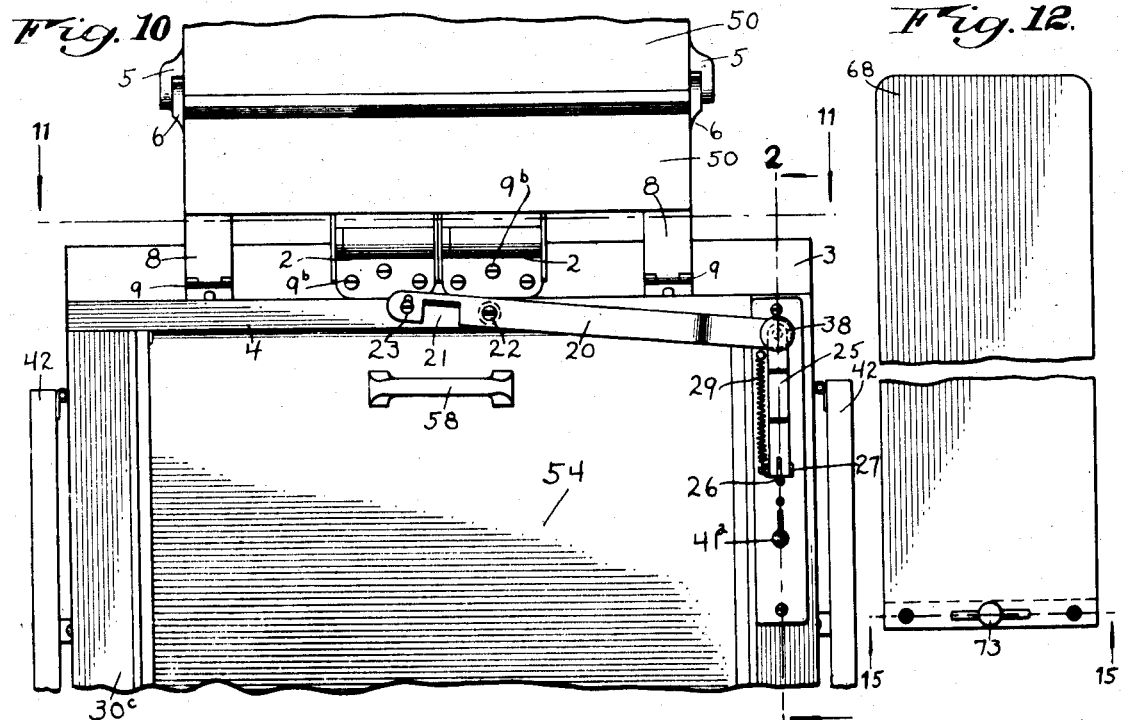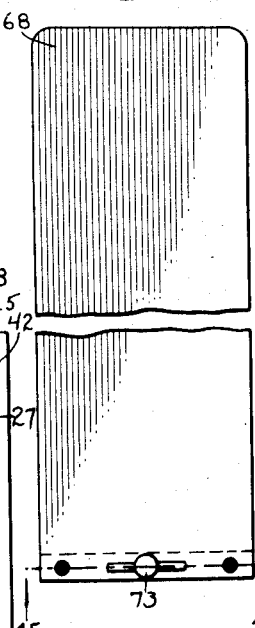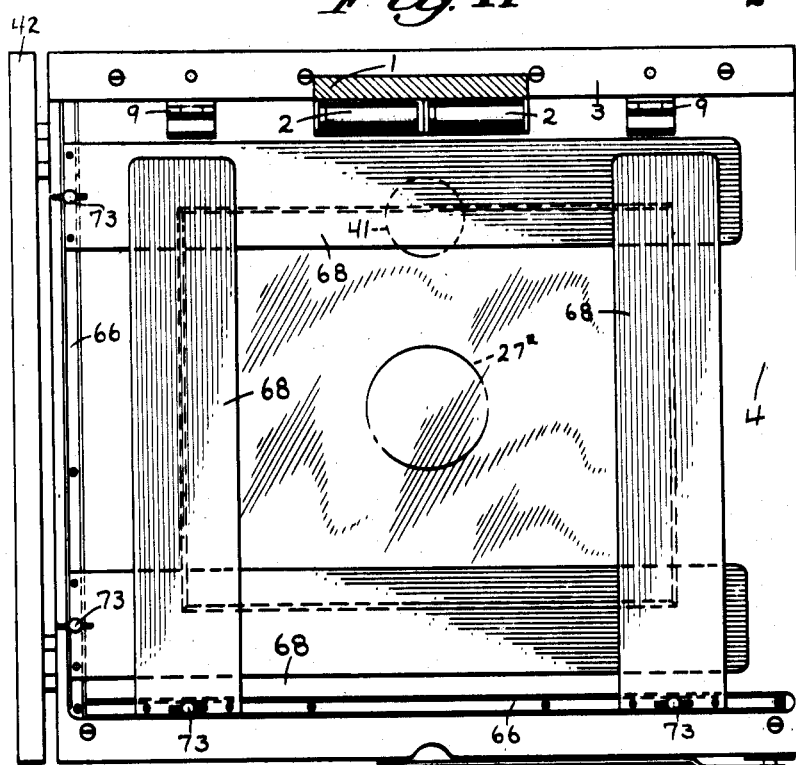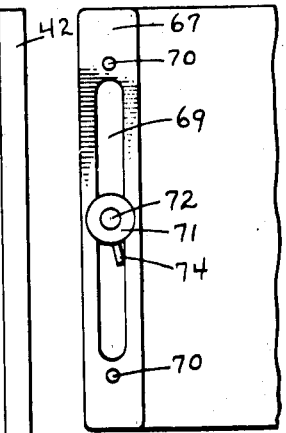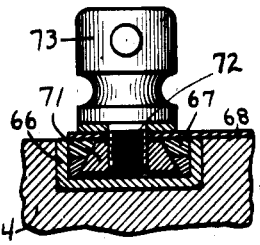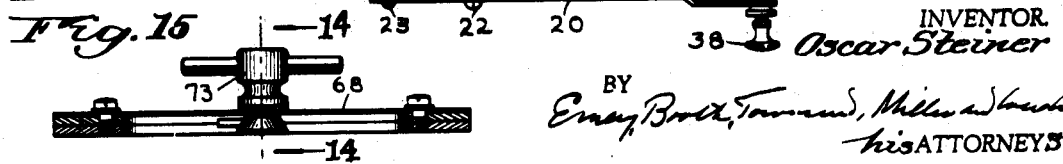

Patented Dec. 10, 1940

2,224,839

UNITED STATES PATENT OFFICE 2,224,839

APPARATUS FOR MAKING PHOTOGRAPHIC CONTACT PRINTS

Oscar Steiner, Irondequoit, N. Y., assignor to The Folmer Graflex Corporation, Rochester, N. Y., a corporation of Delaware Application February 13, 1939, Serial No. 256,018

11 Claims. (Cl. 95—73)

This invention particularly relates to printers for making photographic prints in contact with photographic negatives.

In order that the principle of the invention may be readily understood, I have disclosed one embodiment thereof in the accompanying drawings, wherein—

Fig. 1 is a side view of the photographic contact printer showing the platen top closed and locked;

Fig. 2 is a vertical section on the line 2—2 of Fig. 10 of one of the legs of the contact printer shown in Fig. 1 and representing particularly the switches and the switch operating means;

Fig. 3 is an enlarged detail of the platen top handle and latch, showing the relation of parts when the platen top is down in locked position;

Fig. 4 is a front elevation of the contact printer with one of the side tables extended;

Fig. 5 is a circuit diagram of the contact printer showing the wiring connection between the switches and the lamps;

Fig. 6 is an enlarged detail of a portion of the construction shown in Fig. 11, so as to make more clear the switch mechanism;

Fig. 7 is an enlarged detail of the rocker bar;

Fig. 10 is a front elevation of the upper part of the contact printer with the platen top fully opened and showing the platen top hinge springs;

Fig. 11 is a section on the line 11—11, Fig. 10, very clearly showing the placement of the masking blades, plates or members;

Fig. 12 is an enlarged detail in plan, partly broken away, of one of the said masking blades, plates or members;

Fig. 13 is a bottom plan view of part of one of the masking blades, plates or members, showing the locking means therefor;

Fig. 14 is a section taken through the construction shown in Fig. 15 on the line 14—14 of said figure; and Fig. 15 is a longitudinal section through one of the masking blades, plates or members on the line 15—15, Fig. 12, showing the construction of the locking means therefor.

Figure 8:
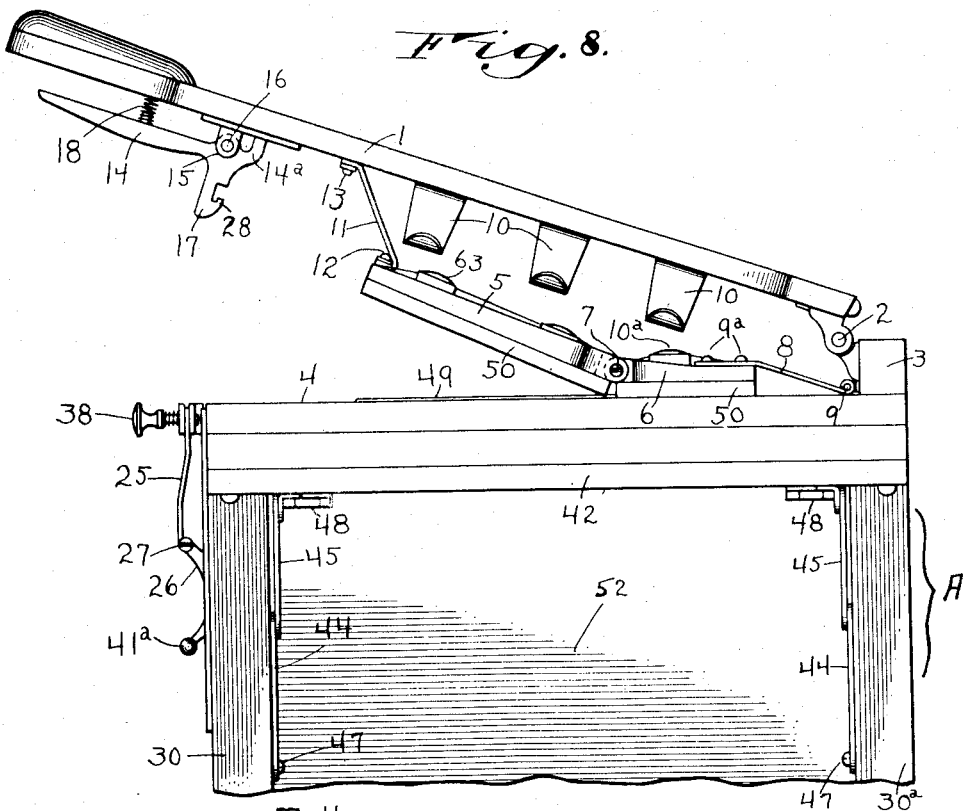
Fig. 8 is a side elevation of the upper part of the contact printer, with the platen top in the position shown in Fig. 9.

By the present invention there is provided a contact printer which is easy to operate with speed and with the assurance that the proper functions are being or will be carried out. When making photographic contact prints, it is necessary to hold the negative and the paper for printing in perfect contact and when they are in that condition, a lamp is caused to be illuminated, which lamp should be extinguished well before the pressure is relieved from the photographic paper. A sufficient time interval should be permitted to elapse so that the lamp is allowed time to cool, at least sufficiently so as not to cause further exposure after the pressure has been released that preserved the contact of the negative and paper. It is apparent that if the pressure be released on the paper and the paper be allowed to separate from the negative before the light is completely extinguished, further exposure would take place with the result that the printing would not be sharp and clear.

I have by my invention provided novel means for controlling the time cycle so that the above specified objectionable condition cannot occur. My invention contains other features, all of which will be fully set forth in the ensuing description.

Without limiting my invention excepting as defined in the claims, I will proceed to describe the preferred construction of contact printer embodying my invention.

Referring first particularly to Fig. 1, the general structure of the contact printer casing is indicated at A. The top platen bar is indicated at 1, it being secured by spring hinges 2 to the platen bar hinge block 3. The printer or platen top is indicated at 4, and thereabove are positioned the forward platen casting 5 and the rear platen casting 6. A hinge 7 is provided to connect the said two platen castings. Said rear casting 6 has connected thereto a platen hinge arm 8 which is hinged at 9 to the platen top 4. The said hinge arm 8 is attached to the rear platen casting 6 by screws 9a. The platen bar hinges 2, 2 are attached to the hinge block 3 by screws 9b, 9b, best shown in Fig. 10. The platen bar springs are indicated at 10, 10, and they ride upon buttons 10a, 10a, as best shown in Fig. 4. I provide a platen stop strap 11 fastened to the platen casting 5 by a screw 12 and fastened to the top platen bar 1 by screw 13. On the outer end of the platen bar 1 there is attached a latch indicated generally at 14 and which is hinged to a bracket 15 by a hinge pin 16.

On the lower portion of the latch 14 is formed or provided a hook 17 most clearly shown in Fig. 3. The said latch 14 is caused to be rotated in a direction away from the top bar 1 (that is, in a contraclockwise direction) under the influence of a spring 18, and the said latch 14 is prevented from traveling too far by an upturned end 14a which at the proper time comes in contact with the plate of the bracket 15.

Referring to Fig. 3 it is there clearly shown that the hook 17 engages a horizontally positioned pivoted or rocking bar 20 (shown most clearly in Figs. 4, 6 and 10) when the platen or printer top 4 has been brought or moved down by manipulation by the operator of the said platen bar 1. Since the tension of springs 10, 10 and of the spring hinge 2 would tend to cause the platen top bar 1 to rise (as will be clear from a study of Fig. 1), means is provided to hold said top bar 1 in its down or functioning position. Such means, constituting one embodiment of this part of my invention, is very clearly illustrated in Figs. 3, 4, 6 and 10, from which it appears that the said bar 20 constitutes a hold down member or device. An enlarged detail view of a portion of the said bar 20 is presented by Fig. 7. The said bar 20 is provided with a notch 21 adapted to be entered or hooked into by the latch 14 causing the said bar 20 to be moved upward under the influence of the springs 10 and the spring hinge 2 previously referred to. The said bar 20 is pivoted on a screw 22 as best shown in Figs. 4, 6, 9 and 10.

The said bar 20 is limited in its movement by a screw or pin 23 which rides in a vertical slot 24 most clearly shown in Fig. 7. Pivoted to the bar 20 is a second upright bar 25, most clearly shown in Figs. 4 and 10, and which is connected to a switch arm or lever 26 by a pin 27.

When the parts are in the position shown in Figs. 1, 2 and 4, the switch arm or lever 26 has been caused to travel downward, thus completing the circuit through a large lamp 27a used for printing and which is clearly indicated in Figs. 1, 2 and 5. In order to release the platen top 4, it is necessary to apply pressure downwardly to the platen bar 1 before the latch 14 can be released. This is very clearly indicated in Fig. 3 where the hook 17 of the latch 14 is shown as provided with an upwardly extended portion 28. The construction and arrangement of parts are such that the said extended portion 28 of the hook 17 will not allow the latch 14 to be moved upward unless the platen bar 1 is first pushed downward so that said hook portion 28 can clear the bar 20. Inasmuch as the bar 20 is caused to pivot about the screw 22 received in the hole 22a (Fig. 7) by a tension coiled spring 29 (shown most clearly in Figs. 2, 4 and 10) the bar 20 will follow the latch 17 in its downward movement and will cause the switch arm or lever 26 to be moved upward, thus breaking the circuit through the large lamp 27a. Therefore, it is necessary to push the platen top bar 1 all the way down before the latch 14 can be released from said bar 20.

Figure 9:
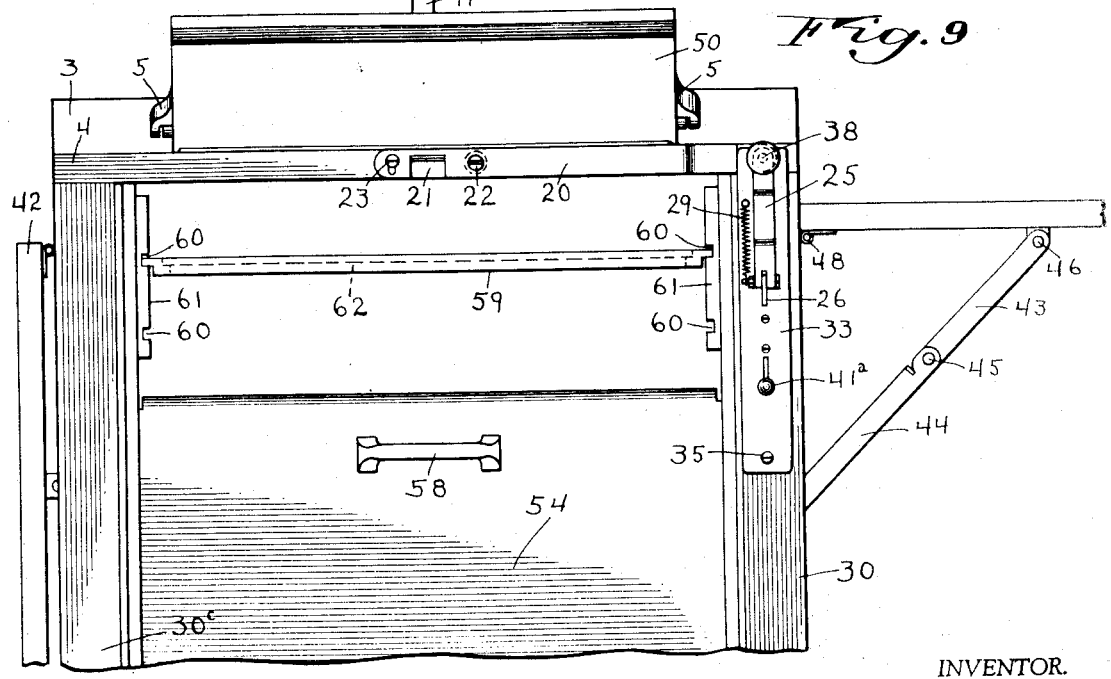
Fig. 9 is a front elevation of the upper part of the contact printer with the platen top partly opened.

In carrying out this cycle of operation, the switch arm 26 is caused to be moved into the position shown in Fig. 9, thereby cutting off the current to lamp 27a before the pressure is released on platen castings 5 and 6.

In Fig. 2, which is a vertical section through one leg 30 of the printer (the legs 30a and 30c of the four legs of the printer being shown in other figures), are clearly shown the connections between the bar 20 and the switch arm or lever 26 which controls a switch 31. The said switch 31 and a second switch 32 are attached to a vertically positioned mounting plate 33 which is held in place by a screw 34 and a screw or screws 35. The upright bar 25 is caused to move with the horizontal, rocking bar 20 through a shoulder bushing 36 that connects them, as clearly indicated in Figs. 2 and 4. Through the bushing 36 passes a dog pin 37 that carries a knob 38 on its outer end and which pin is caused to be moved in an outward direction by coiled tension spring 39, best shown in Fig. 2. The said plate 33 is provided with a hole 40, shown in Fig. 2, into which the dog pin 37 can be pushed, and the said dog pin 37 has a groove which, when pushed through hole 40, holds the dog pin 37 in place against the spring tension 39. The purpose of this construction is to enable the operator to cause the lamp 27a to be illuminated even though the top platen is raised. Such act is sometimes necessary for adjustments in the placing of negatives under the masking blades, plates or members hereinafter referred to.

Normally, however, the dog pin 37 is held out and away from the hole 40 by the spring 39, so that the bar 20 is free to move past the hole 40 without engaging it. Switches 31, 32 are mounted in a housing 40a in the post 30, as clearly indicated in Fig. 2. The wires connecting the said switches 31, 32 are carried down through the said post 30 by means of a conduit 40b. The printer herein disclosed is also provided with a second lamp 41, which is usually a red lamp and provides illumination for the placement of the negative and paper under the masking blades, plates or members before exposure is made. The circuit is such that when the switch 31 is closed, the lamp 41 is extinguished and when the switch 31 is opened, the lamp 41 is connected in series with lamp 27a. Since the resistance of lamp 41 is much higher than that of lamp 27a, the lamp 41 will be caused to be illuminated. The switch 32 has a pivoted arm 41a. The said switch is a main line switch. When the pivoted arm 41a is in the position shown in Figs. 1, 2 and 5, the circuit to the printer is closed. If the pivoted arm 41a is moved upward, the circuit to the printer is open and the operation of the platen will have no effect upon the lamps 27a and 41.

To either side of the printer there is desirably attached a folding shelf 42, 42, held in place by hinge arms 43, 44, which are pivoted together at 45, being attached respectively to the folding shelf 42, as indicated at 46, and to the printer posts 30, 30a with screws 47. Each shelf 42, 42, is hinged to the top of the printer by hinges 48. The top of the printer is provided with a glass plate 49, clearly shown in Fig. 3, and the pressure pad castings 5 and 6 before referred to are provided with a flexible blanket or pressure pad 50, 50, employed for the purpose of holding the paper and the negative in contact above and against the glass 49.

The general construction of the body of the housing of the printer A is very clearly shown in Figs. 1 and 4. The said body is provided with four corner posts, of which the post 30, 30a, 30c are shown. The body is also provided with side panels 52, 52, and a front composed of two panels 54, 55. The back panel is not shown, but may be similar to the side panels. The said panel 54 has attached to it a handle 58. The legs 30 and 30c are provided with grooves in which the said panel 54 is mounted, so as to be free to slide up and down when the operator grasps the handle 58 for that purpose. When the panel 54 is moved all the way to the top, a light-tight box is thus formed which excludes all illumination from the dark room when prints are being made.

Referring to Fig. 9, the housing of the printer A is provided with a sliding rack 59 which is adapted to slide in grooves 60, 60 in side plates 61, 61. The rack 59 is provided with a glass plate shown in dotted lines 62. This plate is used for masking or dodging in the conventional manner.

Referring especially to Fig. 11, it will be seen that the entire top of the printer is exposed, the platen bar 1 having been raised all the way up and represented as cut off in this view. The platen top 4 is provided with channel bars 66, 66 (shown best in enlarged section in Fig. 14), in which slide shoes 67, 67 carrying four masking blades, plates or members 68, 68. The said blades may be made of any suitable material but are preferably of thin or sheet steel. They have riveted to their lower faces the said guide shoes 67 respectively. One of the said guide shoes is clearly shown in Fig. 13 and the cross sectional form thereof is shown in Fig. 14. In each guide shoe 67 is provided an elongated opening 69. Each shoe is fastened to the corresponding blade with rivets 70, 70. In the centre of each shoe 67 is fitted a tapered member or cone 71 which is engaged by a screw 72 attached to knob 73 and prevented from turning in the shoe 67 by a pin 74, clearly represented in Fig. 13.

When the knob 73 is turned in a clockwise direction, inasmuch as screw 72 is provided with a right hand thread and the tapered member or cone 71 is also provided with a right thread, the cone 71 will be caused to rise in the elongated opening 69 which is shaped to fit the cone 71 and has a like taper. The shoe 67 will thus be caused to expand, thereby locking the masking blade assembly to the masking blade bars, track or channel 66. If the knob 73 is turned in a contraclockwise direction, its cone 71 is allowed to move downward, thereby permitting the sides of the blades 67, 67 to contract. Thus, the masking blade assembly can be slid along or lifted out of the track at will. As clearly shown in Fig. 11, there are two of these bars, channels or tracks 66, at right angles to each other, and each receives an end of two of the masking blades, which are four in number, and are positioned for operation as there shown.

This novel construction, which I desire to claim broadly, provides means for permitting the entire removal of the masking blades, plates or members from the top of the printer if desired, thus leaving the entire area free and clear with no projections of any kind to interfere when working with extremely large negatives or paper. While masking devices have, of course, been heretofore employed, they have all had some permanently attached brackets or members of one kind or another that interfered with an absolutely clear top when the masking blades themselves were removed.

In Fig. 5 is clearly shown the circuit diagram of lamps 27a, 41, and in Fig. 2 are shown the switches 31 and 32. The switch 31 is provided with contacts 75 and 76 and the switch 32 is provided with contacts 77 and 78. The wires 79 and 80 are the incoming lines which are attached to the receptacle or plug-receiving member 81, shown in Fig. 1. Into the said receptacle or member 81 fits a connecting plug 82 provided with a cord 83 which carries conductors 83a, 83b.

In operation, assuming 79 to be positive and 80 to be negative, current flows through 79 to the contact 78, and switch 32 is closed as shown in Fig. 5. Current will flow under such conditions through wire 80. Assuming that switch 31 is in the open position, current will flow through wire 84, through lamp 41 and through wires 85 and 86, lamp 27a and wire 80. It will be noted that the two lamps 27a and 41 are in series, and since the resistance, as previously stated, of the lamp 41 is much higher than that of lamp 27a, the former will be illuminated approximately at full brilliance. Now assuming that switch 32 is still closed and that switch 31 is closed as indicated in Fig. 5, current will now flow through wire 79, contact 76, contact 77, wire 84, wire 87, contact 78, contact 75, and wire 86, and will return through wire 86, lamp 27a, and wire 80. In this condition, lamp 41 has been short circuited by the switch 32 and the lamp 27a will burn at full brilliance. This is the condition when exposure is being made.

I will now give a brief summary of the operation.

Switch 32 is closed through pivoted arm 41a, which action illuminates lamp 41. The top platen bar 1 is raised all the way up. The negative is placed on the glass 49 and photographic paper is placed in contact with the negative. The masking blades 68, 68 are adjusted for the proper area of picture. These masking blades, which are thin, lie between the negative and the photographic paper. The top platen bar 1 is brought down carrying with it platen castings 5, 6, and pressure pads 50, 50, which contact with the photographic paper, placing the latter in firm contact with the negative, and the negative in turn in firm contact with the glass 49. The act of bringing the top platen bar 1 down carries the latch 14 down therewith. The said top bar 1 is pushed all the way down until hook 17 engages in the notch 21 of the bar 20. Pressure then is released from the top bar 1, and the springs 10, 10 in contact with the buttons 63, 63, cause the top bar 1 to move upward carrying with it the switch lever 26, against the action of spring 29, thereby closing the switch 31. The lamp 27a is now illuminated and will remain illuminated as long as the parts are in this position.

After sufficient exposure time has elapsed, the top bar 1 is again thrust down, this act being necessary because the projection 28 of the hook 17 will not permit the latch 14 to be disengaged from bar 20 excepting when the bar 1 is all the way down. Inasmuch as the bar 20 tends to move up under the influence of spring 29, said bar 20 will follow latch 14 until movement of said bar 20 is stopped by screw 23 in slot 24. However, during this travel the switch lever 26 has moved upward, opening switch 31, extinguishing lamp 27a and illuminating lamp 41. The latch 14 can now be released from the bar 20 and the platen top bar 1 opened for the removal of the paper and negative, or of the paper alone if a number of prints are to be made from the same negative.

It will be evident from the foregoing detailed description concerning the manipulation of the parts to insure clear, sharp prints, that I have provided for an additional or safety movement in the act of releasing the top platen bar 1. Briefly stated, when the negative and paper have been positioned upon the glass, the operator grasps the handle of the top platen bar 1 together with the latch 14 so as to move the platen top down onto the paper and negative. This downward motion is continued until the latch 14 engages with the pivoted bar or lever 20. The operator then takes his hand off the handle of the top platen bar 1, whereupon the handle moves upward a short distance and at the same time the switch is manipulated to light the printing lamp 27a. Such slight upward movement of the handle occurs because the bar or lever 20 moves slightly in a clockwise direction (see Fig. 4), since the slight upward movement of the said handle under the influence of the springs 10 causes the latch 14 when engaged with the notch 21 of the bar or lever 20 to move said bar or lever 20 in a clockwise direction. Then the operator permits sufficient time to elapse for printing, whereupon, without releasing the latch 14, he pushes down upon the handle of the top platen bar 1 which will cause the printing lamp 27a to be extinguished, the bar or lever 20 being at the same time moved slightly in a contraclockwise direction into a horizontal position. The operator continues his pressure upon the handle of the top platen bar 1, and while so continuing his pressure he exerts sufficient pressure upon the latch 14 to release the same from the bar or lever 20. The operator must maintain pressure upon the handle while releasing the latch. Otherwise by releasing the latch the handle would be forced up by the pressure of the springs 10 thereon and the light 27a would still remain on.

Inasmuch as the projection 28 is provided, the latch will not through any carelessness of the operator be released without the light 27a having first been extinguished, and the presence of said projection 28 compels a further downward movement or continuation of the downward movement of the top platen bar 1 after the light 27a has been extinguished. Thus, there is provided a short but well defined and effective safety time interval after the extinguising of the light 27a before the platen device is released. Thus the printing of clear, sharp negatives is insured.

Although my invention is shown and described as applied to a contact printer, it is to be understood that certain or all the features thereof may be used in an enlarger or in a combined printer and enlarger.

Having thus described one illustrative embodiment of the invention, it is to be understood that although specific terms are employed, they are used in a generic and descriptive sense and not for purposes of limitation, the scope of the invention being set forth in the following claims.

I claim:

1. Apparatus for printing for photographic purposes from negatives comprising a housing or enclosure having illuminating means and a top, a glass-like plate upon said top to receive the negatives and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, said platen-operating member being manually operable to release the same, and thereby to extinguish the said illuminating means, said platen-operating member having means compelling a safety time interval to occur after the extinguishment of the illuminating means before the platen device can be released and which release is itself substantially precedent in time to the movement of the platen-device from functioning position.

2. Apparatus for printing for photographic purposes from negatives comprising a housing or enclosure having illuminating means and a top, a glass-like plate upon said top to receive the negative and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, said platen operating member being operable manually to release the same and to extinguish the illuminating means, but having a safety time interval means connected therewith to compel the retention of the platen device in functioning position without any release of pressure of the platen-device through such movement of the platen-operating member, until such safety time interval has elapsed.

3. Apparatus for printing for photographic purposes from negatives comprising a housing or enclosure having illuminating means and a top, a glass-like plate upon said top to receive the negative and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, said platen-operating member having a latch to engage said means, said means when so engaged by said latch being movable to cause the said illuminating means to function, the said latch having a construction constituting safety means preventing the release of the platen-operating member until after a safety time interval following the time of extinguishment of the said illuminating means and which release is itself substantially precedent in time to the movement of the platen-device from functioning position.

4. Apparatus for printing for photographic purposes from negatives comprising a housing or enclosure having illuminating means and a top, a glass-like plate upon said top to receive the negative and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, said platen-operating member having a latch pivoted thereon, a lever pivoted upon the said housing or enclosure to be engaged by said latch to hold the platen device in functioning position, operating connections between the illuminating means and said lever to light and extinguish the illuminating means, the latch and the parts immediately cooperating therewith being constructed to effect the extinguishing of the illuminating means at a safety time interval before the release of the platen-operating member can be effected by said latch and which release is itself substantially precedent in time to the movement of the platen-device from functioning position.

5. Apparatus for printing for photographic purposes from negatives comprising a housing or enclosure having illuminating means and a top, a glass-like plate upon said top to receive the negative and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, said platen-operating member having a latch, a movable member upon the housing positioned to be engaged by the latch when the platen device is moved down into functioning position, said movable member being operatively connected with the illuminating means, whereby the illuminating means is caused to function when the latch engages said movable member, said latch and the parts immediately cooperating therewith having safety means to prevent simultaneous extinguishing of the illuminating means and the release of the platen device, and which release is itself substantially precedent in time to the movement of the platen-device from functioning position, but compelling the illuminating means first to be extinguished.

6. Apparatus for printing for photographic purposes from negatives, comprising a housing or enclosure having an electric light printing lamp and a top, a glass-like plate upon said top to receive a negative and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, and safety means carried by the platen-operating means operatively connected both to the illuminating means and to the platen device to compel the extinguishment of the printing lamp before it effects the release of the platen-operating member and which release is itself substantially precedent in time to the movement of the platen-device from functioning position.

7. Apparatus for printing for photographic purposes from negatives, comprising a housing or enclosure having an electric light printing lamp and a top, a glass-like plate upon said top to receive a negative and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, said platen-operating member having a latch pivoted thereon, a lever pivoted upon the housing or enclosure to be engaged by said latch to hold the platen device in functioning position, a switch for said printing lamp, a member operatively connected to said lever, spring means connected with said lever tending to move said lever in a direction to open the switch and extinguish the printing lamp, said pivoted latch having means compelling an additional or safety movement in the act of releasing the platen device, thus providing a time interval following the extinguishing of the lamp before the platen device is released.

8. Apparatus for printing for photographic purposes from negatives, comprising a housing or enclosure having an electric light printing lamp and a top, a glass-like plate upon said top to receive a negative and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, said platen-operating member having a latch pivoted thereon, said latch having a hook with a prolongation to prevent release of the platen-operating member until a safety time interval has elapsed after the extinguishing of the printing lamp and which release is itself substantially precedent in time to the movement of the platen-device from functioning position, and a lever pivoted upon the housing so as to be engaged by said latch, and operating connections between said lever and the printing lamp.

9. Apparatus for printing for photographic purposes from negatives, comprising a housing or enclosure having an electric light printing lamp and a top, a glass-like plate upon said top to receive a negative and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, a latch pivoted upon the underside of the platen-operating member, said latch having a hook provided with a prolongation to prevent release of the platen-operating member until a safety time interval has elapsed after the extinguishing of the printing lamp, and which release is itself substantially precedent in time to the movement of the platen-device from functioning position, a member adapted to be engaged by the said hook of said latch, and operating connections from the said member to the printing lamp to operate the latter.

10. Apparatus for printing for photographic purposes from negatives, comprising a housing or enclosure having an electric light printing lamp and a top, a glass-like plate upon said top to receive a negative and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, a latch pivoted upon the platen-operating member, a lever pivoted upon the housing in position to be engaged by said latch when the platen operating member is brought into printing position, a movable member connected to said member and to a switch of said printing lamp, the said latch and lever having interengaging formations compelling an additional or safety movement of the latch to release the platen-operating member after the switch has been moved to extinguish the printing lamp.

11. Apparatus for printing for photographic purposes from negatives, comprising a housing or enclosure having an electric light printing lamp and a top, a glass-like plate upon said top to receive a negative and sensitized paper, a platen device adapted to be moved to and from functioning engagement with the paper upon the negative, a platen-operating member for manual manipulation, means mounted in position to be engaged by said platen-operating member when the latter is moved for functioning operation, thereby holding the platen device in functioning position and operatively connected to the said illuminating means to cause the latter to function when the platen is moved into functioning position, a latch pivoted upon the platen-operating member, a lever pivoted upon the housing in position to be engaged by said latch when the platen-operating member is brought into printing position, a member having a pivotal engagement with the lever and connected to the switch of the printing lamp to light and extinguish the same, and means connected with the said levers and said members to hold the parts in position to cause the printing lamp to continue functioning notwithstanding a release of the latch for permitting inspection or like purpose.

OSCAR STEINER.